United States Patent [19]

McKerrow et al.

[11] 4,046,323
[45] Sept. 6, 1977

[54] PROCESS FOR CONTROLLED SLOW COOLING OF NON-FERROUS SMELTING SLAGS

[75] Inventors: George C. McKerrow, Toronto; Albert Pelletier; Christopher J. Newman, both of Noranda, all of Canada

[73] Assignee: Noranda Mines Limited, Toronto, Canada

[21] Appl. No.: 685,907

[22] Filed: May 12, 1976

[30] Foreign Application Priority Data

Feb. 9, 1976 Canada .................................. 245274

[51] Int. Cl.$^2$ ...................... B02C 23/10; C03B 17/00
[52] U.S. Cl. .......................................... 241/23; 65/19; 75/24; 75/30; 75/63; 75/72; 209/3; 209/11; 241/24; 266/137; 266/232
[58] Field of Search ................... 75/63, 72, 30, 92, 24; 266/201, 232, 137; 65/19, 20; 110/171; 122/235 N; 241/20, 23, 24; 209/11, 3

[56] References Cited

U.S. PATENT DOCUMENTS

| 1,402,363 | 1/1922 | Hurst ........................................ 65/19 |
| 2,798,048 | 7/1957 | Magri et al. ........................ 75/24 X |

FOREIGN PATENT DOCUMENTS

| 546,402 | 9/1957 | Canada ..................................... 65/19 |
| 547,627 | 10/1957 | Canada ..................................... 75/30 |

*Primary Examiner*—Robert L. Lindsay, Jr.
*Attorney, Agent, or Firm*—Fleit & Jacobson

[57] ABSTRACT

A process for controlled slow cooling of non-ferrous smelting slags, such as copper slags, for the recovery of the non-ferrous metals contained therein by subsequent crushing, milling and flotation operations is disclosed. The process comprises the steps of pouring the molten slag into a ladle, allowing the slag to slowly cool and solidify in the ladle at least to the point where a shell is formed which is strong enough to withstand dumping from the ladle, dumping the slag from the ladle in a single piece, allowing the dumped slag to cool until its center is substantially solidified, and breaking the dumped slag in small pieces for further cooling, crushing, milling and flotation operations. Alternatively, the top of the slag in the ladle may be water cooled while the slag is allowed to slowly cool in the ladle until its center is substantially solidified. The slag is then dumped and subsequently broken in small pieces.

13 Claims, 1 Drawing Figure

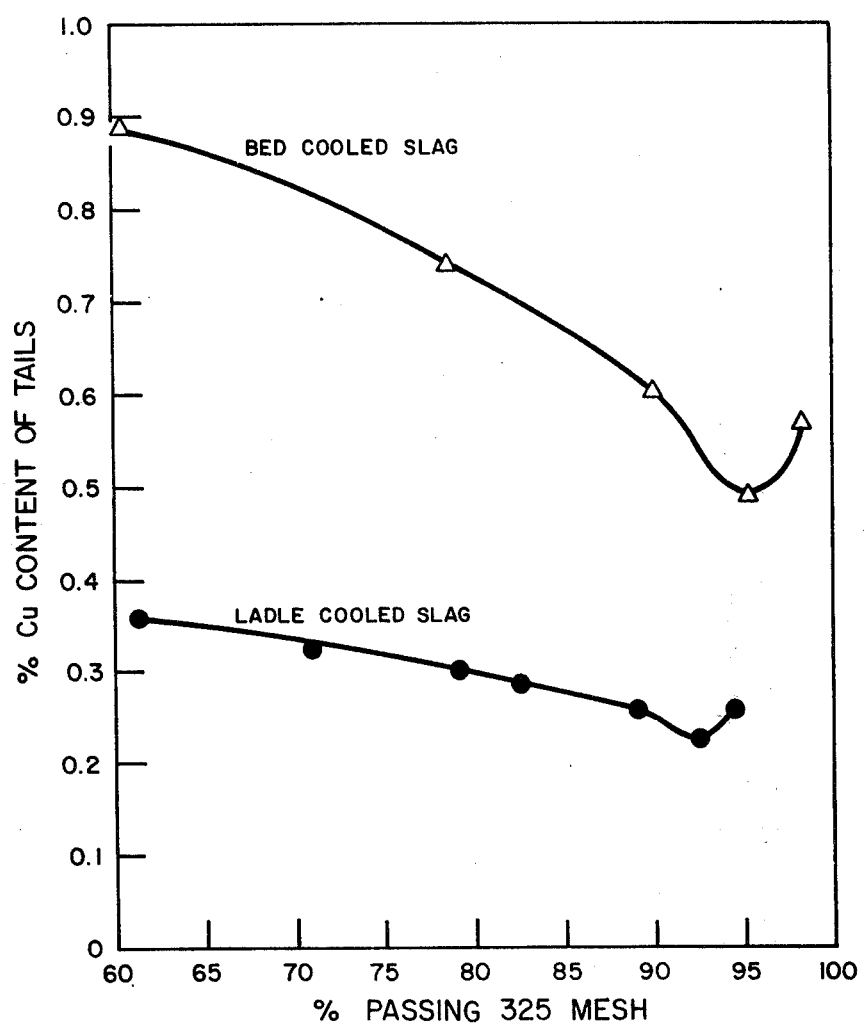

PROCESS FOR CONTROLLED SLOW COOLING OF NON-FERROUS SMELTING SLAGS

This invention relates to a process for controlled slow cooling of non-ferrous smelting slags, such as copper smelting slags, for the recovery of the non-ferrous metals contained therein by subsequent crushing, milling and flotation operations.

The production of non-ferrous metals by pyrometallurgical smelting processes produces slags which often contain significant amounts of recoverable metals. Examples are the so-called converter slags which are produced during the conversion of matte into copper, or the slags produced by the continuous smelting and converting of copper concentrates, such as described in Canadian Pat. No. 758,020.

One method of recovering this copper and other metals is slag milling followed by flotation. It is well established in the art that lower copper levels in the tailings are obtained if the slag is slow cooled prior to crushing because the slow cooling promotes growth or coagulaton of the particles of copper or copper compounds in the slag. The known methods for slag cooling are to cast the molten slag onto beds in the ground or into small molds attached to a travelling chain. In a typical operation with beds, molten slag is transported in suitable ladles to the cooling beds. The beds are usually formed depressions in the ground, approximately 25 feet long by 10 feet wide by 2 feet deep. The beds can be formed by using crushed gravel or waste slag. Each bed of this size contains approximately eighty tons of slag. The liquid slag is poured into the bed and allowed to cool. The later part of the cooling process may be enhanced using water sprays. When a bed is cooled to approximately 250° F, it is broken to 12 in. pieces by means of a ripper attached to a tractor or similar machine and crushed for grinding. In a typical operation with a travelling chain, the molds move slowly along a chain which is long enough to permit solidification of the slag in the small molds to a point where it can be dumped into a chute in a single piece and moved to a crusher for breaking it in small pieces.

The above disclosed methods are not satisfactory as a large porportion of the slag is cooled too quickly which causes high tailing losses. In addition, maintenance of the cooling beds and handling of the slag is expensive and there is considerable dilution of the slag with bed making material. Moreover, under wet or icy weather conditions, when the cooling bed contains water, a hazard exists in that the molten slag may explode on contact with the water.

It is therefore the object of the present invention to improve recovery of the non-ferrous metals in the slag by providing controlled cooling of non-ferrous slags so as to obtain particles of non-ferrous metals which are on the average larger in size than the ones obtained with the prior art coolling methods.

It is also an object of the present invention to provide a process wherein loss of valuable non-ferrous metals is reduced to a low value and wherein the risks of explosion are minimized.

The process, in accordance with a first embodiment of the invention, comprises the steps of pouring the molten slag into a ladle, allowing the slag to slowly cool and solidify in the ladle at least to the point where a shell is formed which is strong enough to withstand dumping from the ladle, dumping the slag from the ladle as a single piece, allowing the dumped slag to cool until its center is substantially solidified, and breaking the dumped slag in several pieces for further cooling, crushing, milling and flotation operations.

The slag is left to cool until its center has cooled to a temperature below 1800° F before it is broken in small pieces. Preferably, the dumped slag is left to cool to a temperature below 1000° F so as to render it more brittle for the subsequent breaking operation. The dumped slag may also be cooled with water sprays after it is solidified to facilitate crushing.

Using a 40-ton ladle, the initial cooling period prior to dumping is typically at least 15 hrs until a shell of between 10 to 15 inches is formed. The dumped slag is typically left to cool after dumping for about 5 days until all the slag is below 1000° F before breaking it in small pieces.

In accordance with a second embodiment of the invention, the process comprises the steps of pouring the molten slag into a ladle, water cooling the top of the slag in the ladle while allowing the slag to slowly cool until its center is substantially solidified, dumping the slag from the ladle and breaking the dumped slag in small pieces for further cooling, crushing, milling and flotation operations.

In the above embodiment, water cooling is preferably done by covering the top of the slag in the ladle with water although water may simply by sprayed on the surface of the slag in the ladle.

The cooling period of the slag in the ladle in the last mentioned mode of operation of the process is about 24 hrs which is generally longer than with the first disclosed mode of operation of the process. However, the center of the slag is substantially solidified and less cooling time is required after dumping with the result that the total cooling time is shorter. In addition, water cooling renders the slag more brittle and facilitates breaking and crushing.

The invention will now be disclosed with reference to preferred embodiments thereof and to the accompanying drawing which illustrates a graph of fineness of grind versus tailings assay for slags cooled in beds and in ladles.

One preferred technique for carrying out the process of the invention is described as follows:

The slag typically at 2200° F is poured into a ladle which is transported to a cooling area. If desired, the initial cooling rate of the slag can be increased by the addition of suitable cooling agents. When sufficient slag has solidified to form a strong outer shell, it is dumped in one piece from the ladle so that the ladle can be reused. Typically, this dumping operation can be performed by diesel or electrically operated machines or locomotives. The dumped slag is left to cool and then broken open to speed the final cooling. The solidified slag can be broken as soon as its center has cooled to 1800° F, although usually it is left unitl all the material is below 1000° F as it is then easier to break. The slag could also be left to cool in the ladle before dumping until its center has cooled below 1800° F.

In a typical operation, the slag was cast into a 40-ton ladle and allowed to stand for at least 15 hours until a shell of 10 to 15 inches had formed. The slag was dumped from the ladle without breaking open and allowed to cool for about 5 days until all the material was below 1000° F. The slag was then broken to approximately 12 in. pieces by impact hammer. The broken slag was crushed to approximately 0.25 in. before grinding.

Crushing was carried out in a 36 x 48 in. Jaw Crusher then by a 7 ft. standard cone crusher followed by screening and rolls crushing. The crushing rate was about 325 tons of slag/hr. The slag was subsequently sent to the grinding mill and flotation circuit for copper recovery.

Another technique for carrying out the process of the invention is as follows:

The slag typically at 2200° F is poured into a ladle which is transported to a cooling area. Water is sprayed or otherwise added on top of the slag in the ladle while the slag is allowed to cool until it is substantially solidified. A typical cooling period would be about 24 hrs. The ladle is then tilted to pour excess water and transported to a breaking area where it is dumped and subsequently broken into small pieces with a ball or a hammer. After about 10 blows, most of the slag was reduced to 5 inch pieces and was further crushed in the manner disclosed above. This last mentioned method requires a longer cooling period in the ladle but the center of the slag is substantially solidified when dumped so that less cooling is needed after dumping before breaking the slag in small pieces. Typically, the slag may be broken about 2 hrs after it is dumped. In addition, water cooling has the advantage of enhancing the brittleness of the slag, while not substantially affecting the subsequent copper recovery.

The improvement in milling characteristics is shown by the graph of fineness of grind versus tailings assay to slags cooled in beds and in ladles as illustrated in the drawing. The ladle cooled slags give lower tailings at any fineness of grain and are less sensitive to changes in the particle size. This means that less energy is required for grinding and the resulting coarser material makes the concentrating operation easier by reducing reagent consumption and improving thickening and filtering. A comparison of typical milling operations for the two types of slag cooling is shown in the following Table I:

TABLE I
COMPARISON OF LADLE COOLED AND BED COOLED SLAG - MATTE PRODUCTION

LADLE COOLED SLAG

| Material | Weight (tons) | Copper Content (%) |
| --- | --- | --- |
| Slag Milled | 3548 | 6.65 |
| Concentrate Produced | 560.2 | 40.54 |
| Tails | 2987.8 | 0.29 |
| Recovery of Copper in Concentrate | | 96.33% |

BED COOLED SLAG

| Material | Weight (tons) | Copper Content (%) |
| --- | --- | --- |
| Slag Milled | 16430 | 9.06 |
| Concentrate Produced | 4002.9 | 35.19 |
| Tails | 12427.1 | 0.64 |
| Recovery of Copper in Concentrate | | 94.65% |

The slag tested in the above Table I is one produced by the continuous smelting and converting of copper concentrates to high grade copper matte as disclosed in the above mentioned Canadian patent. It is to be noted that with ladle cooled slag, milling and flotation yielded a concentrate containing 40.54% Cu and tailings containing 0.29% Cu. Tests on ladle-cooled slags produced by the continuous smelting and converting of copper concentrate to copper have also shown that improved tailings and concentrate grade can be obtained as compared to bed cooled slags as shown in the following Table II:

TABLE II
COMPARISON OF LADLE COOLED AND BED COOLED SLAG-COPPER PRODUCTION

LADLE COOLED SLAG

| Material | Weight (tons) | Copper Content (%) |
| --- | --- | --- |
| Slag Milled | 2911.0 | 8.25 |
| Concentrate Produced | 453.8 | 50.72 |
| Tails | 2457.2 | 0.40 |
| Recovery of Copper in Concentrate | | 95.9% |

BED COOLED SLAG

| Material | Weight (tons) | Copper Content (%) |
| --- | --- | --- |
| Slag Milled | 23858 | 9.59 |
| Concentrate Produced | 4901.7 | 44.44 |
| Tails | 18956.3 | 0.584 |
| Recovery of Copper in Concentrate | | 95.16% |

Tests have been performed on ladle sizes other than 40 tons down to 10 tons with the same metallurgical results. The process of this invention is however not restricted to any ladle size and larger or smaller units could be cast with the same metallurgical results. The process is particularly suited to slags produced by copper converters or slags produced by the process for continuous smelting and converting of copper concentrates such as described in the above Canadian patent, but it is to be understood that it is not restricted to these slags.

The advantages of the above disclosed process over the previously established art are that a controllable slow cooling rate, necessary for efficient copper recovery, is achieved. There are also fewer handling problems and less dilution of the slag and the explosion hazards are minimized.

What is claimed is:

1. Process for controlled slow cooling of copper smelting slags for promoting growth or coagulation of copper particles in the slag and so enhance the recovery of copper contained therein by subsequent crushing, milling and flotation operations, comprising the steps of:
    a. pouring the molten slag into a ladle having a capacity of greater than about 10 tons
    b. allowing the slag to cool slowly and solidify in the ladle at least to a point where the temperature at its center is below about 1800° F and a shell is formed which is strong enough to withstand dumping from the ladle;
    c. dumping the slag from the ladle as a single piece;
    d. allowing the dumped slag to cool until its center is substantially solidified;
    e. breaking the dumped slag into small pieces to enhance further cooling of the slag;
    f. crushing the small pieces of slag to approximately 0.25 inch;
    g. feeding the crushed slag to a grinding mill; and
    h. feeding the ground slag to a flotation circuit to recover copper.

2. Process as defined in claim 1, in which the dumped slag is left to cool until its center has cooled to a temperature below 1000° F before it is broken in small pieces so as to render it more brittle.

3. Process as defined in claim 1, wherein the ladle containing the slag is transported to a cooling area.

4. Process as defined in claim 1, wherein the dumped slag is cooled with water sprays after it is solidified to facilitate crushing.

5. Process as defined in claim 1, wherein the slag is poured in a 40-ton ladle and allowed to cool for at least 15 hrs until a shell of about 10 to 15 inches is formed before dumping.

6. Process as defined in claim 5, wherein the dumped slag is left to cool for at about 5 days until all the slag is below 1000° F.

7. Process as defined in claim 6, wherein the dumped slag is broken to approximately 12 in. by impact hammer, further crushed to approximately 0.25 in. and then sent to the milling and flotation operations.

8. Process for controlled slow cooling of copper smelting slags for promoting growth or coagulation of copper particles in the slag and so enhance the recovery of copper contained therein by subsequent crushing, milling and flotation operations comprising the steps of:
 a. pouring the molten slag into a ladle having a capacity of greater than about 10 tons;
 b. water cooling the top of the slag in the ladle while allowing the slag to cool slowly until its center is substantially solidified and is at a temperature below about 1800° F;
 c. dumping the slag from the ladle;
 d. breaking the dumped slag into small pieces to enhance further cooling of the slag;
 e. crushing the small pieces of slag to approximately 0.25 inch;
 f. feeding the crushed slag to a grinding mill; and
 g. feeding the ground slag to a flotation circuit to recover copper.

9. Process as defined in claim 8, wherein the slag is cooled by covering the top of the slag in the laddle with water.

10. Process as defined in claim 8, wherein the ladle containing the slag is transported to a cooling area.

11. Process as defined in claim 8, wherein the slag is poured in a 40-ton ladle and allowed to cool for about 24 hrs until its center has substantially solidified.

12. Process as defined in claim 11, wherein the dumped slag is left to cool for about 2 hours after dumping.

13. Process as defined in claim 13, wherein the dumped slag is broken to approximately 5 in. by impact hammer, further crushed to approximately 0.25 in. and then sent to the millling and flotation operations.

* * * * *